Jan. 5, 1932. C. H. HAPGOOD Re. 18,324
SAFETY RAZOR
Original Filed May 2, 1925 2 Sheets-Sheet 1
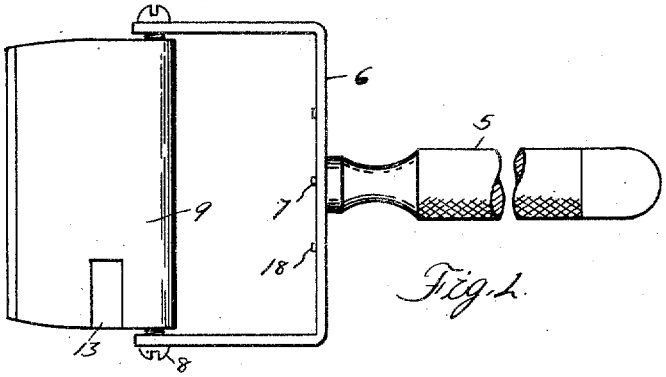
Fig. 1.
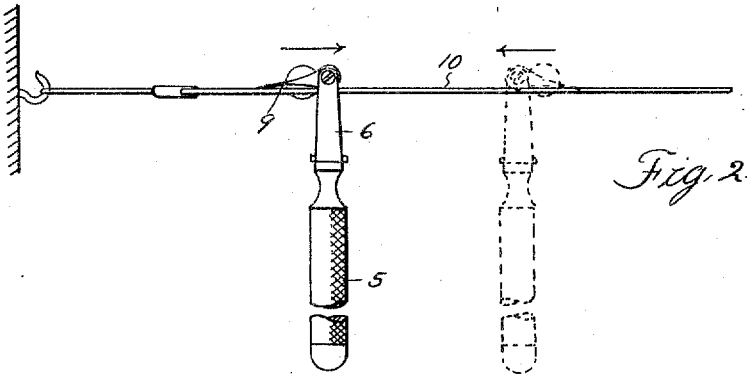
Fig. 2.
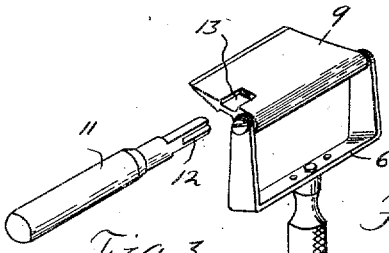
Fig. 3.
Fig. 4.
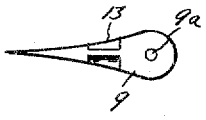
Fig. 5.
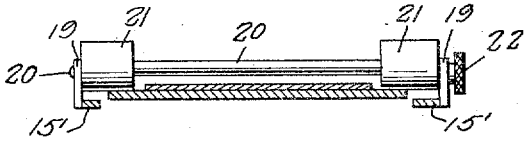
Fig. 12
INVENTOR
Clarence H. Hapgood
BY
Rex Frye.
ATTORNEY Jan. 5, 1932. C. H. HAPGOOD Re. 18,324
SAFETY RAZOR
Original Filed May 2, 1925 2 Sheets-Sheet 2
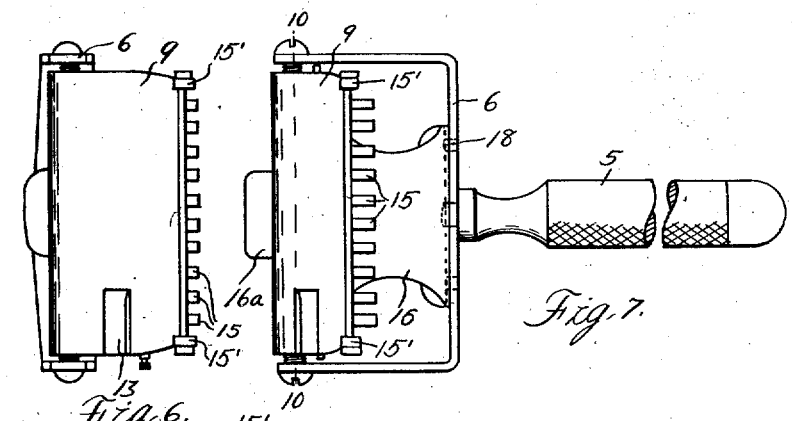
Fig. 6.
Fig. 7.
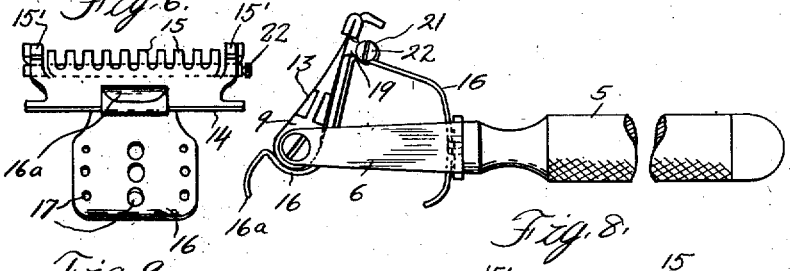
Fig. 9.
Fig. 8.
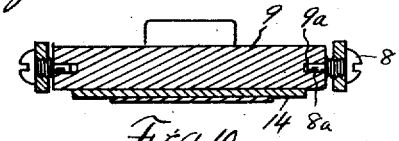
Fig. 10.
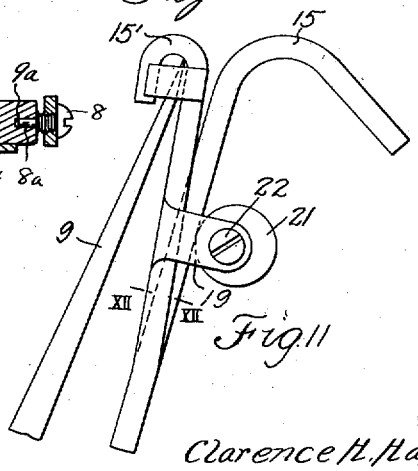
Fig. 11
INVENTOR
Clarence H. Hapgood
BY
Rex Frye.
ATTORNEY Reissued Jan. 5, 1932

Re. 18,324

UNITED STATES PATENT OFFICE

CLARENCE H. HAPGOOD, OF TOLEDO, OHIO; ELMA A. HAPGOOD EXECUTRIX OF SAID CLARENCE H. HAPGOOD, DECEASED, ASSIGNOR TO ELMA A. HAPGOOD

SAFETY RAZOR

Original No. 1,672,028, dated June 5, 1928, Serial No. 27,357, filed May 2, 1925. Application for reissue filed October 17, 1929. Serial No. 400,415.

This invention relates to safety razors and has for its principal object the provision of a relatively permanent blade of high grade steel mounted in a holder adapted to serve as part of a frame during the shaving operation and as a guide during the operation of stropping.

It has long been customary to consider safety razor blades as small, thin strips of medium grade steel intended for use only a comparatively few times after which they are discarded. It is an object of this invention to replace the usual flimsy temporary blades with a relatively heavy blade of high grade razor steel which will last practically as long as other parts of the device. Such blade is pivotally mounted within a frame comprising a holder and a handle rigidly secured thereto, and means are provided to position it at any desired angle relatively to the frame.

Another object of the invention is the provision of a guard structure adapted to detachably engage both the blade and frame, and which can be adjustably secured to the frame in several positions.

A further object of the invention is the provision of a guard member having means for adjustably controlling the clearance space between the blade edge and the adjacent surface of the central teeth of the guard member, whereby the closeness with which the blade will shave may be varied at will.

A further object of the invention is the arrangement of novel means for holding the blade during the stropping and honing operations by provision of a handle detachably securable to the blade in an improved manner and position whereby the blade may be slid in the usual manner over the surface of ordinary strops and hones.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a plan view of my improved safety razor with the detachable guard removed.

Figure 2 is a side view of the razor in the positions assumed while being stropped.

Figure 3 is a detail perspective view of the auxiliary handle for engaging the blade during the stropping operation.

Figure 4 is a similar view of the blade and frame in position to co-act with the auxiliary handle.

Figure 5 is a detail side view of the razor blade.

Figure 6 is an end view of my improved razor in position for shaving.

Figure 7 is a bottom plan view thereof.

Figure 8 is a side elevation thereof.

Figure 9 is a detail elevation of the detachable guard for positioning the blade at any desired angle relatively to the frame.

Figure 10 is a detail section taken substantially on the line 10—10 of Figure 7.

Figure 11 is a detail cross-sectional view of one end of the guard member and the cutting edge of a blade, showing the construction of the adjusting mechanism for varying the clearance space between the guard teeth and the cutting edge of the blade, and Figure 12 is a detail sectional view taken substantially on the line 12—12 of Figure 11.

Referring now to the drawings, the numeral 5 designates a handle and 6 a holder rigidly but detachably secured thereto, as by a threaded stem 7, this assembly thus constituting a frame. The holder 6 is substantially U-shaped and comprises side members and a transverse member, and is preferably provided with threaded apertures in its extremities for the reception of the fulcrum screws 8, which are preferably formed substantially as shown in Figure 10 with round tenons $8^a$, adapted to fit within the apertures $9^a$ in the blade 9 to permit ready rotation of the blade to position it at any desired angle relatively to the frame. The blade 9 is preferably an integral piece of high grade steel having a relatively thick rear portion in which are located the apertures $9^a$ and a body portion tapering gradually to the cutting edge portion which is preferably beveled substantially as shown. If desired the body portion of the blade 9 may be hollow ground between the cutting edge portion and the thickened rear portion, whereby only the cutting edge portion and the sides of the thickened rear portion contact a strop 10 during the stropping operation, or a hone during a honing operation (note Fig. 2). The blade can be honed and stropped without being removed from the frame, and on the usual hones and strops now in general use. The blade has a large wearing surface against the hone or strop and can always be kept to a super-keen edge, after the manner of the old-fashioned razors rather than the modern safety razor blades of ribbon steel. The honing or stropping operation with my improved safety razor is performed exactly like honing or stropping of an old-fashioned razor except that the blade itself is grasped by the operator through the medium of an auxiliary handle 11 (not Fig. 3), and then slid along the surface of the strop or hone as long as desired. The auxiliary handle 11 is formed with a pair of clamping tines 12 adapted to engage the body portion of the blade at a point intermediate the cutting edge portion and the thickened rear portion of the blade, or more particularly at a point intermediate the cutting edge and the axis upon which the blade is mounted. This insures grasping the blade at a point conducive to easy stropping. This feature is of decided advantage as it is of great assistance to the mere novice in learning to strop the blade correctly, as this position of the handle relative to the blade makes it unnecessary to apply any rotary force to the handle during the stropping stroke in order to put pressure on the cutting edge, as would otherwise be necessary if the handle were attached to the blade at a point in axial alignment with the axis upon which the blade is mounted. With this feature, the only requirement is mere downward pressure upon the blade, flat-wise against the strop, and the force thus applied will provide the necessary pressure at the cutting edge, due to the fact that the handle is attached to the blade at a point between the axis and the cutting edges. In the illustrated embodiment I have provided a pair of notches 13 in the body portion of the blade adjacent one side thereof for the reception of the tines 12 of the auxiliary handle. The notches 13 are preferably of such depth that the outer surfaces of the tines 12 will not extend beyond the opposite faces of the blade and contact the strop or hone instead of permitting the desired contacts only between the cutting edge portion of the blade and its thickened rear portion. During the honing or stropping operation the holder 6 depends from the thickened rear portion of the blade 9 and acts as a pendulum to maintain the blade in contact with the strop or hone. Moreover, the side members of the holder 6 act as guides for preventing the lateral slipping of the blade during the honing or stropping operations. Preferably the strop or hone used is of slightly less width than the distance between the side members of the U-shaped holder 6 to permit a slight turning of the blade so that the blade will set with its edge at an angle to the sides of the strop other than a right angle. This permits the usual positioning of the blade relatively to the surface of the strop or hone, and the side members of the holder then engage the sides of the strop to prevent deviation from the desired angle while the blade is being slid along the surface of the strop or hone.

The operation of honing or stropping would, accordingly, be carried out by merely inserting the strop or hone between the side members of the holder 6 and holding it in substantially horizontal position. The holder 6 then hangs from the thickened surface of the blade 9 and the blade rests upon the upper surface of the strop 10 substantially as shown in Figure 2. The auxiliary handle 11 is then inserted into the notches 13 of the blade and the blade with its attached holder alternately pushed and pulled over the surface of the strop or hone while downward pressure is exerted on the handle 11. At the end of each stroke the blade is turned by partially rotating the handle 11 so that the cutting edge portion of the blade is pointed in the desired direction, and this position is then maintained during the remainder of the stroke. These alternate strokes over the strop or hone may be continued as long as desired.

After the auxiliary handle 11 has been removed, the blade may be used for shaving without detaching it from the holder 6. A guard structure 14, preferably formed substantially as shown in Figure 9 is positioned upon the blade 9 and the frame. The guard structure 14 herein shown comprises a guard member having a series of rounded and downturned teeth 15 adjacent one end and a securing member 16 of resilient material being adapted to snap into position over the thickened portion of the blade 9 and press against the inner face of the transverse member of the holder 6. The guard member 14 and securing member 16 are preferably welded or otherwise suitably united so as to form a substantially integral piece. The angle at which the blade 9 is held relatively to the handle 5 may be adjusted to suit the convenience of the user and positively locked in each adjusted position in any suitable manner as by a plurality of aligned apertures 17 in the securing member 16. As herein shown enlarged central apertures are adapted to fit over the threaded stem 7 of the handle 5 and the smaller side apertures are adapted to fit over studs 18 extending from the inner surface of the transverse member of the holder 6, substantially as shown in Figure 7, but this arrangement is merely a matter of expediency. The endmost guard teeth 15′ are preferably bent upwardly and over the blade to serve in positioning the guard upon the blade and prevent the accidental relative movement of the blade and guard during the shaving operation. The free extremity of the securing member 16 is preferably curved to provide a finger engaging projection 16ᵃ to facilitate the positioning of the guard within the frame and its removal therefrom.

This may be arranged for in any expedient manner but as herein shown the endmost guard teeth 15′ are made flexible relative to the adjacent central teeth 15, in a direction substantially perpendicular to the plane of the top surface of the latter, and the end teeth 15′ are provided with downturned apertured ears 19 for the reception of the stub shafts 20 eccentrically mounted in the ends of the eccentric adjusting roller 21. This roller is substantially cylindrical, but with the stub shafts eccentrically mounted in its ends and journaled in the ears 19 of the endmost guard teeth, the rotation of the eccentric roller will serve to warp or flex the endmost teeth 15′ of the guard, and cause the cutting edge of the blade to move closer to the central guard teeth, as the thicker portion of the roller comes between the shafts 20 and the teeth or far away, as the case may be, thus varying the clearance between them. It will be understood that the arms carrying the innermost teeth are normally flexed above the position corresponding to the least effective radial position of the member 21 so that the resiliency of the arms will hold the member 21 firmly in contact with the surface of the guard member, then, as the shaft 20 is adjusted radially, the influence of the eccentric member 21 will move the cutting edge of the blade toward the central teeth of the guard member and decrease the extent of the clearance space therebetween. Then as the wider portion of the roller moves in the opposite direction the resiliency of the metal of the endmost teeth will serve to move the blade away from the central teeth, the under surface of the teeth remaining always in engagement with the periphery of the roller 21. A knurled handle 5 may be provided for ready rotation of the adjusting member 21. It will be noted that the eccentric adjusting roller is carried by the guard member 14 and is removed with the guard member when it is desired to strop or hone the blade clearance. After the desired adjustment of the blade relatively to the central guard teeth 15 is once secured, it may be held indefinitely, the central guard teeth remain in the desired position under the control of the adjusting roller 21 regardless of whether or not the guard member 14 is secured upon the blade.

While this construction herein shown may be considered as a preferred form, similar results may be satisfactorily obtained with other constructions without departing from the principle of warping a portion of the guard member to vary the clearance between the cutting edge of the blade and the central teeth of the guard member. This feature is also described in detail and specifically claimed in my co-pending application, Serial No. 400,416, and is therefore not specifically claimed in the present application, although it will be observed that I have herein shown a slight modification of the construction therein described, in that the adjusting roller is here shown as peripherally smooth (round in fact) rather than polygonal as there shown, obviously, however, the function and operation are substantially the same.

It will be noted that the blade 9 and associated parts can be readily cleaned after the shaving operation, or whenever desired. When the guard member 14 is removed from the blade and frame, the blade and frame can be thoroughly scoured by holding under the faucet and allowing the running water to remove the extraneous matter, or the frame and blade may be swished in water standing in a bowl or the like, the operator holding to the tip of the handle 5. Likewise the guard member 14 may be readily cleansed by immersion in a standing body of water or held in the stream from a faucet.

Moreover, it will be noted that my improved safety razor is particularly designed for speedy action. The guard member 14 can be snapped on the blade, and instantly removed by grasping the projection 16ᵃ. The blade is readily stropped with a few strokes over the surface of the strop, and the cleansing operation can be quickly completed. The holder 6 can then be disassembled from the handle 5 and the entire mechanism housed in any desired container. The edge portion of the blade 9 is preferably folded into the U-shaped holder 6 when the device is housed in a container.

While it will be apparent that the illustrated embodiment of my invention herein disclosed is well calculated to adequately fulfill the objects and advantages primarily stated, it is to be understood that the invention is susceptible to variation, modification and change within the spirt and scope of the subjoined claims.

Having described my invention, I claim:

1. In a safety razor, a holder, a blade pivotally supported on said holder, said blade being formed at a point intermediate said pivotal support and its cutting edge to receive a handle for stropping, and a detachable handle adapted to engage said blade for moving said blade over a strop.

2. In a safety razor, a holder, a blade pivotally supported on said holder, said blade having means for securing a handle thereto at a point intermediate said pivotal support and its cutting edge for stropping, and a detachable handle adapted to engage said blade for moving said blade over a strop.

3. In a safety razor, a frame comprising a holder and a handle detachably secured thereto, and a blade pivotally supported on said holder, said blade being formed at a point intermediate said pivotal support and its cutting edge to receive a detachable handle for moving said blade over a strop.

4. In a safety razor, a frame comprising a holder and a handle detachably secured thereto, and a blade pivotally supported on said holder, said blade having means for detachably securing a handle thereto at a point intermediate said pivotal support and its cutting edge for moving said blade over a strop.

5. In a safety razor, a holder comprising side members and a transverse member, and a blade having a cutting edge and a thick edge, said blade being pivotally supported on said side members on an axis substantially parallel with but spaced from the cutting edge thereof, said axis also being spaced from said transverse member to permit a strop to be inserted between said blade and said transverse member, said blade being formed to receive a detachable handle at a point intermediate said cutting edge and said axis for moving said blade over said strop.

6. In a safety razor, a holder comprising side members and a transverse member, and a blade having a cutting edge and a thick edge pivotally supported on said side members on an axis substantially parallel with but spaced from the cutting edge thereof, said axis also being spaced from said transverse member to permit a strop to be inserted between said blade and said transverse member, said blade having means for detachably securing a handle thereto at a point intermediate said cutting edge and said axis for moving said blade over said strop.

7. In a safety razor, a holder comprising side members and a transverse member, a blade having a cutting edge and a thick edge pivotally supported on said side members on an axis intermediate said edges, said axis also being spaced from said transverse member to permit a strop to be inserted between said blade and said transverse member, and a handle having means for detachably connecting the same with said blade at a point intermediate said cutting edge and said axis for moving said blade over said strop.

8. In a safety razor, a blade having a cutting edge and a thick edge, a holder for pivotally supporting said blade on an axis intermediate said edges and substantially parallel with said cutting edge, said blade being formed at a point intermediate said cutting edge and said axis to receive a handle for stropping, and a detachable handle adapted to engage said blade at said point for moving said blade over a strop.

9. In a safety razor, a holder, a blade having a cutting edge and a thick edge, said blade being supported by said holder on an axis intermediate its edges and substantially parallel to its cutting edge, and having means positioned at a point intermediate said cutting edge and said axis for securing a handle thereto for stropping, and a detachable handle adapted to engage said blade at said point for moving said blade over a strop.

10. In a safety razor, a frame comprising a holder and a handle detachably secured thereto, and a blade having a cutting edge and a thick edge, said blade being pivotally supported on said holder at its thick edge and said blade being formed at a point intermediate the said cutting edge and pivotal support to receive a detachable handle for moving said blade over a strop.

11. In a safety razor, a frame comprising a holder and a handle detachably secured thereto, and a blade having a cutting edge and a thick edge, said blade being pivotally supported on said holder at its thick edge, and said blade being provided with means positioned at a point intermediate the said edge and pivoted support for detachably securing a handle thereto for moving said blade over a strop.

12. In a safety razor, a frame, a blade pivotally supported within said frame and having a cutting edge and a thick edge, and a guard structure having a portion arranged to engage said blade near the cutting edge thereof, another portion arranged to engage the thick edge of said blade and still another portion arranged to connect with said frame at a point spaced from the axis of said blade.

13. In a safety razor, a frame, a blade pivotally supported within said frame and having a cutting edge and a thick edge, and a guard structure having a portion arranged to engage said blade near the cutting edge thereof, another portion arranged to engage the thick edge of said blade and still another portion having means for adjustably connecting the same with said frame, whereby the relation of said guard and said blade to said frame may be varied.

14. In a safety razor, a frame, a blade pivotally supported within said frame and having a cutting edge and a thick edge, a guard structure having a portion arranged to engage said blade near the cutting edge thereof, another portion arranged to engage the thick edge of said blade and still another portion arranged to connect with said frame to retain said guard in position on said frame, and means for adjustably connecting said last mentioned portion with said frame, whereby the relation of said guard and said blade to said frame may be varied.

15. In a safety razor, a frame comprising side members and a transverse member, a blade having a cutting edge and a thick edge, said thick edge being pivotally supported between the side members of said frame on an axis parallel with said cuting edge, said axis being spaced from the transverse member of said frame, and a removable guard structure comprising a guard member having a part engaging said blade near the cutting edge thereof and a supporting member having a part curved to engage the thick edge of said blade and also having a part to engage said frame and retain said guard structure in position on said frame.

16. In a safety razor, a frame comprising side members and a transverse member, a blade having a cutting edge and a thick edge, said thick edge being pivotally supported between the side members of said frame on an axis parallel with said cutting edge, said axis being spaced from the transverse member of said frame, and a removable guard structure comprising a guard member having a part engaging said blade near the cutting edge thereof, and a supporting member having a part curved to engage the thick edge of said blade and also having a part to engage said frame and retain said guard structure in position on said frame, and means for securing the last mentioned part of said guard structure to said frame in different positions so as to vary the radial position of said guard member and said blade relative to said frame.

17. In a safety razor, a frame, a blade pivotally supported within said frame and having a cutting edge and a thick edge, a guard structure of relatively resilient material having portions arranged to engage said blade near the cutting edge thereof, and a portion arranged to engage the thick edge of said blade and also having other portions arranged adjacent said cutting edge, and means carried by said first mentioned portions to vary the relation of said last mentioned portions to said cutting edge, by selectively deforming said resilient guard member.

18. In a safety razor, a frame, a blade pivotally supported within said frame and having a cutting edge and a thick edge, a guard structure of relatively resilient material having portions arranged to engage said blade near the cutting edge thereof, and a portion arranged to engage the thick edge of said blade and also having other portions arranged adjacent said cutting edge, and means carried by one of said portion to vary the relation of said last mentioned portions to said cutting edge by selective resilient deformation of said guard member.

19. In a safety razor, a frame comprising a holder and a handle detachably secured thereto, a blade having a cutting edge and a thick edge pivotally supported in said holder on an axis positioned intermediate said edges and extending parallel therewith, said blade being arranged to receive a detachable handle at a point intermediate said cutting edge and said axis for moving said blade over a strop, and a guard structure having a portion arranged to engage said blade near the cutting edge thereof, another portion arranged to engage the thick edge of said blade, and another portion having means for adjustably connecting the same with said frame whereby the common angular relation of said guard and said blade to said frame may be selectively varied.

20. The combination with a safety razor, of a frame, comprising a holder and a handle, adapted to be used with a blade pivotally supported in said holder having a cutting edge and a thick edge, a guard structure for frictional attachment to said blade having portions to engage said blade near the cutting edge thereof, another portion arranged to engage the thick edge of said blade, other portions arranged parallel with the blade adjacent the cutting edge thereof and in spaced relation thereto, thereby providing a clearance space therebetween, and another portion having means for adjustably connecting the guard structure with said frame whereby the common angular relation of said guard and said blade to said frame may be varied, and adjustable means carried by one of said portions to vary the extent of said clearance space.

21. In a safety razor, a holder, a blade pivotally supported on said holder on an axis substantially parallel with but spaced from its cutting edge, and a handle having means for detachably connecting the same with one end of said blade at a point between said axis and said cutting edge.

22. In a safety razor, a holder, a blade pivotally supported on said holder on an axis substantially parallel with but spaced from its cutting edge, and a handle having means for detachably connecting the same with one end of said blade at a point between said axis and said cutting edge, said holder being so arranged that when said blade is supported by said handle said holder will depend from said blade.

23. In a safety razor, a holder, a handle adapted to be secured thereto, a pair of tenons secured in the holder, and a blade pivotally mounted on the tenons, the blade being notched to receive a stropping tool.

24. In a safety razor, a holder, a handle adapted to be secured thereto, a blade directly secured within the holder and having an edge portion and a relatively thick rear portion, and a guard plate arranged to engage the holder, the sides of the edge portion of the blade and the central portion of the rear portion of the blade.

25. In a safety razor, a holder, a handle adapted to be secured thereto, a blade directly secured within the holder and having an edge portion and a relatively thick rear portion, a guard plate arranged to engage the sides of the edge portion and the central portion of the rear portion of the blade, and means for securing the guard plate upon the holder in a plurality of adjusted positions.

26. In a safety razor, a holder, a handle adapted to be secured thereto, a blade directly secured within the holder and having an edge portion and a relatively thick rear portion, a guard plate arranged to engage the sides of the edge portion and the central portion of the rear portion of the blade, means for securing the guard plate upon the holder in a plurality of adjusted positions comprising spaced projections on the holder, and a flexible holder engaging portion of the guard plate having a plurality of aligned apertures therein adapted to co-act with the projections on the holder.

27. In a safety razor, a holder, a handle adapted to be secured thereto, a blade directly secured to the holder, means for securing the blade in predetermined angular relation to the holder comprising a toothed guard plate adapted to engage the blade and holder, and means carried by the guard plate for moving the teeth thereof to adjust the distance of the teeth from the edge of the blade.

28. In a safety razor, a holder, a handle adapted to be secured thereto, a blade directly secured to the holder, and means for securing the blade in predetermined angular relation to the holder comprising a toothed guard plate adapted to engage the blade and holder comprising an eccentric roller mounted upon the guard plate and engaging the teeth.

29. In a safety razor, a holder, a handle adapted to be secured thereto, a blade directly secured to the holder, and a detachable handle adapted to directly engage the blade for moving the blade over a strop.

30. In a safety razor, a holder, a handle adapted to be secured thereto, a blade directly secured to the holder, and a second handle having spaced jaws adapted to engage the blade for moving the blade over a strop.

31. In a safety razor, a holder, a handle adapted to be secured thereto, a blade directly secured to the holder, and having a notch adjacent one side edge, and a second handle adapted to fit in said notch of the blade for moving the blade over a strop.

32. In a safety razor, a holder, a handle adapted to be secured thereto, a blade directly secured to the holder and having a pair of alined notches adjacent one side edge, and a second handle having a pair of spaced jaws adapted to fit into said notches of the blade for moving the blade over a strop.

33. In a safety razor, a holder, a blade pivoted upon the holder and having a notch adjacent one side edge, and a detachable holder adapted to fit in said notch of the blade for moving the blade over a strop.

CLARENCE H. HAPGOOD.